United States Patent
Ogawa

(10) Patent No.: US 8,610,817 B2
(45) Date of Patent: Dec. 17, 2013

(54) IMAGE-CAPTURING APPARATUS AND CONTROL METHOD THEREFOR

(75) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 13/328,723

(22) Filed: Dec. 16, 2011

(65) Prior Publication Data

US 2012/0162495 A1 Jun. 28, 2012

(30) Foreign Application Priority Data

Dec. 28, 2010 (JP) ................................. 2010-293801
Nov. 21, 2011 (JP) ................................. 2011-254459

(51) Int. Cl.
*H04N 5/232* (2006.01)
*G03B 13/00* (2006.01)

(52) U.S. Cl.
USPC .......................................... 348/353; 348/345

(58) Field of Classification Search
USPC ............................ 348/345–353, 169; 382/118
See application file for complete search history.

(56) References Cited

U.S. PATENT DOCUMENTS 7,787,762 B2 * 8/2010 Abe .............................. 396/263
8,289,440 B2 * 10/2012 Knight et al. ................. 348/349
2008/0068487 A1 * 3/2008 Morita ...................... 348/333.05
2009/0002512 A1 * 1/2009 Suzuki et al. ............... 348/222.1
2010/0033593 A1 * 2/2010 Sasaki ......................... 348/222.1
2010/0128163 A1 * 5/2010 Nagasaka et al. ............. 348/348
2010/0315521 A1 * 12/2010 Kunishige et al. .......... 348/220.1
2011/0038624 A1 * 2/2011 Muramatsu ................... 396/104
2011/0261220 A1 * 10/2011 Matsuda .................... 348/222.1

FOREIGN PATENT DOCUMENTS

| JP | 04-346333 | 12/1992 |
| JP | 08-063597 | 3/1996 |
| JP | 2009-005316 | 1/2009 |
| JP | 2009-058834 | 3/2009 |

* cited by examiner

*Primary Examiner* — Kelly L Jerabek
(74) *Attorney, Agent, or Firm* — Cowan, Liebowitz & Latman, P.C.

(57) ABSTRACT

In an image-capturing apparatus capable of executing focus detection processing in which auto-focus detection of an imaging optical system is performed based on a contrast of a captured image, and expression detection processing in which a specific expression of a subject is detected from the captured image in parallel, if it is determined that a peak of focus state has not been found in the auto-focus detection, execution of the expression detection is not allowed, or use of a result of the expression detection performed by the expression detection unit is not allowed. Thus, excellent expression detection accuracy is achieved even if the auto-focus detection processing and the expression detection processing are performed in parallel.

9 Claims, 5 Drawing Sheets

F I G. 4
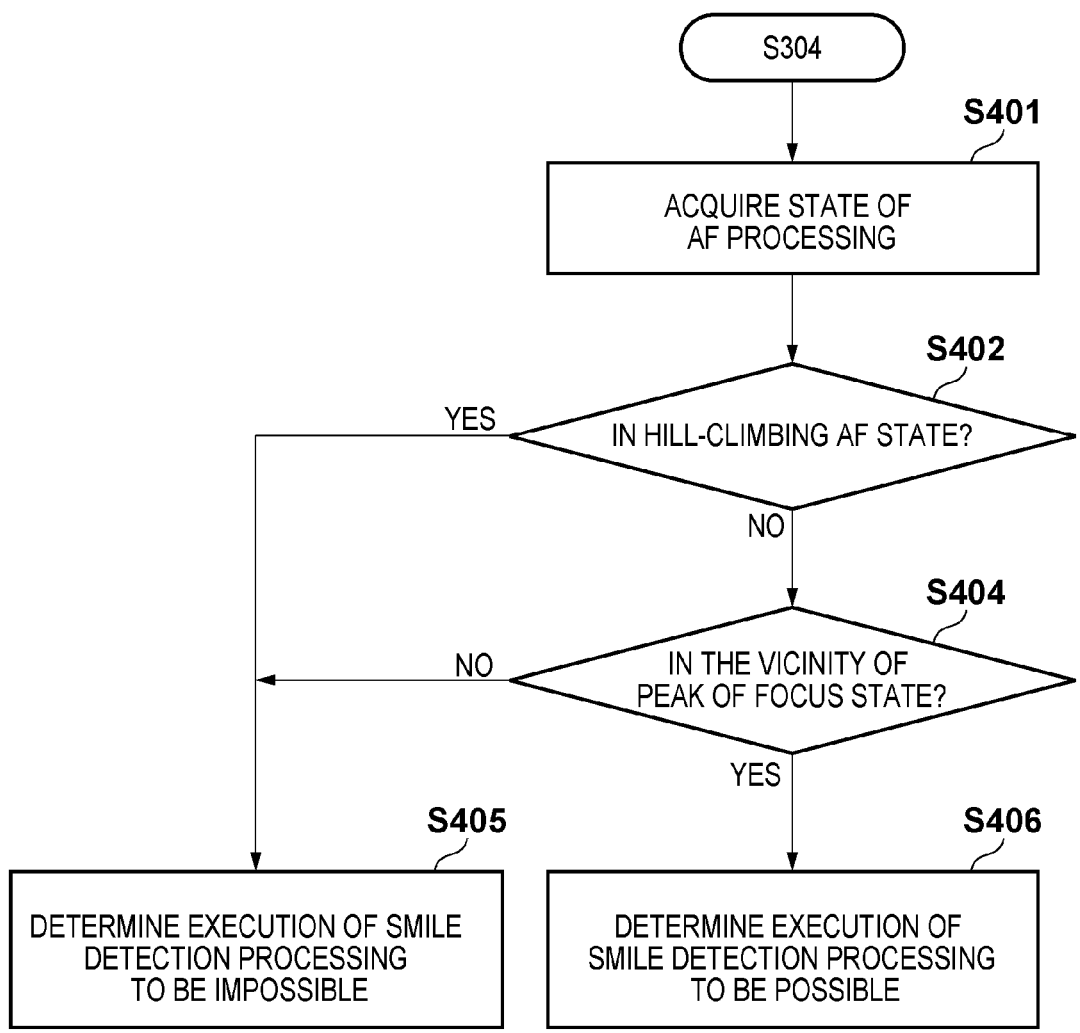

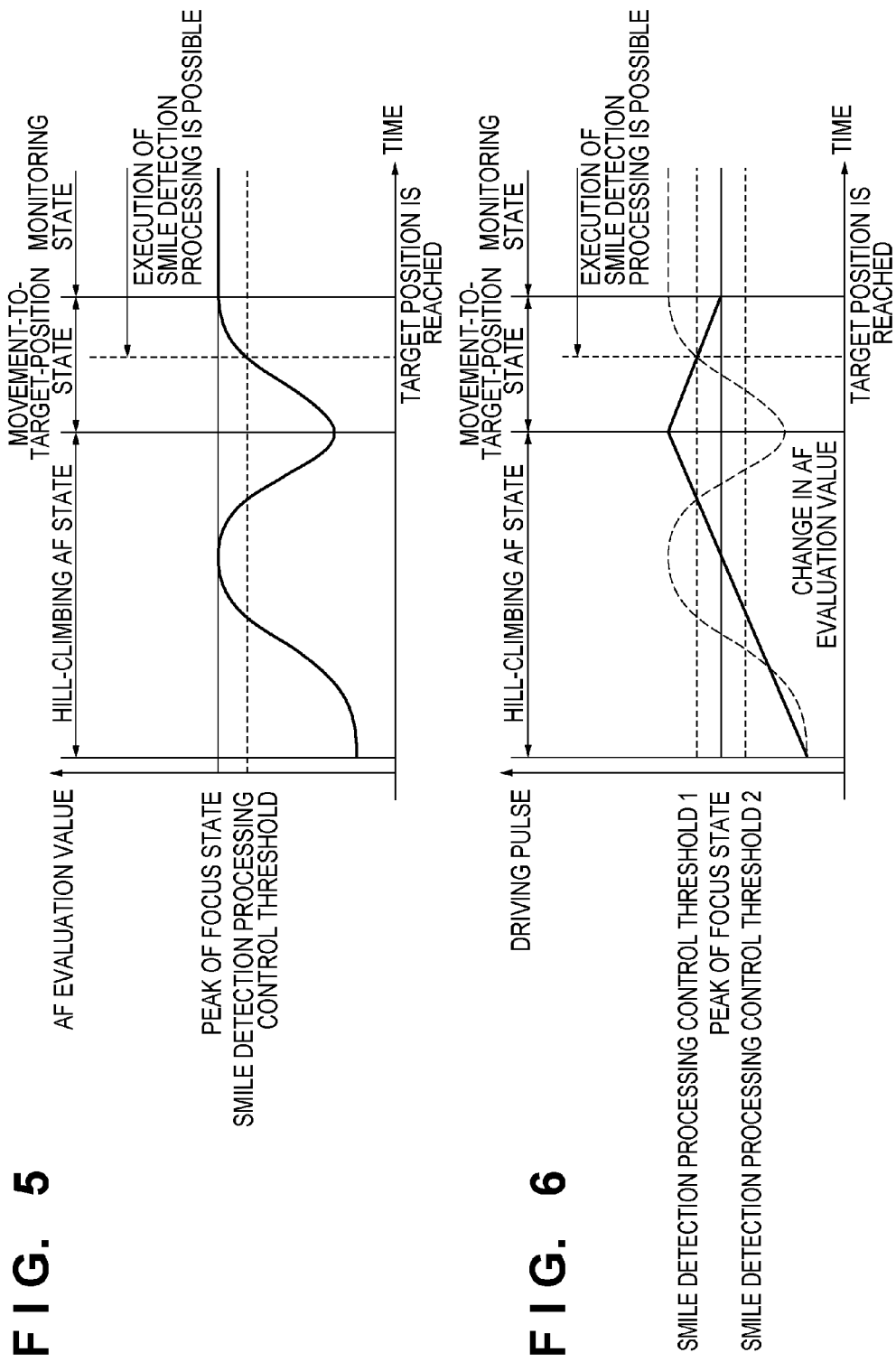

IMAGE-CAPTURING APPARATUS AND CONTROL METHOD THEREFOR

BACKGROUND OF THE INVENTION

1. Field of the Invention

The present invention relates to an image-capturing apparatus and a control method therefor, and particularly, relates to an image-capturing apparatus having a function of detecting facial expressions and a control method therefor.

2. Description of the Related Art

Recently, techniques for detecting facial expressions, in particular, facial expressions of a person, have been put to practical use, and an image-capturing apparatus is known that includes a mode in which an image is automatically captured when a person is detected to be smiling.

Japanese Patent Laid-Open No. 2009-005316 discloses an image-capturing apparatus that automatically captures an image when a person is detected to be smiling, in which focus detection and aperture control are performed when a shutter switch is pressed halfway, smile detection processing is started when the shutter switch is further pressed, and an image is captured upon detection of a smile.

With such an image-capturing apparatus having a function of automatically capturing an image upon detection of a person's smile (smile shutter function), there may be cases in which autofocusing processing is continuously performed in parallel with the smile detection. In this case, if the distance to the person whose smile is to be detected is greatly different from the focal length of the lens, smile detection is performed based on a blurred image, which may result in erroneous smile determination.

SUMMARY OF THE INVENTION

The present invention achieves excellent expression detection accuracy in an image-capturing apparatus that has a function of performing a predetermined operation upon detection of a certain expression of a subject, even if auto-focus detection processing and expression detection processing are performed in parallel.

According to one aspect of the present invention, there is provided an image-capturing apparatus comprising: a capturing unit that captures an image of a subject; a focus detection unit that performs auto-focus detection of an imaging optical system based on a contrast of an image captured by the capturing unit; an expression detection unit that detects a specific expression of the subject from the image captured by the capturing unit; and a control unit, wherein: the image-capturing apparatus being capable of executing the auto-focus detection performed by the focus detection unit and the expression detection performed by the expression detection unit in parallel; and in a case where it is determined in the auto-focus detection performed by the focus detection unit that a peak of focus state has not been found, the control unit does not allow execution of the expression detection performed by the expression detection unit, or does not allow use of a result of the expression detection performed by the expression detection unit.

According to another aspect of the present invention, there is provided a method for controlling an image-capturing apparatus, the image-capturing apparatus comprising: a capturing unit that captures an image of a subject; a focus detection unit that performs auto-focus detection of an imaging optical system based on a contrast of an image captured by the capturing unit; and an expression detection unit that detects a specific expression of the subject from the image captured by the capturing unit, the image-capturing apparatus being capable of executing the auto-focus detection performed by the focus detection unit and the expression detection performed by the expression detection unit in parallel, and the method comprising a controlling step of, in a case where it is determined in the auto-focus detection performed by the focus detection unit that a peak of focus state has not been found, not allowing execution of the expression detection performed by expression detection unit, or not allowing use of a result of the expression detection performed by the expression detection unit.

Further features of the present invention will become apparent from the following description of exemplary embodiments with reference to the attached drawings.

BRIEF DESCRIPTION OF THE DRAWINGS

FIG. 4 is a flowchart illustrating an example of processing performed in step S304 in FIG. 3.

FIG. 5 is a timing chart illustrating an example of processing performed in step S404 in FIG. 4.

FIG. 6 a timing chart illustrating another example of the processing performed in step S404 in FIG. 4.

DESCRIPTION OF THE EMBODIMENTS

Exemplary embodiments of the present invention will now be described in detail in accordance with the accompanying drawings.

Figure 1:
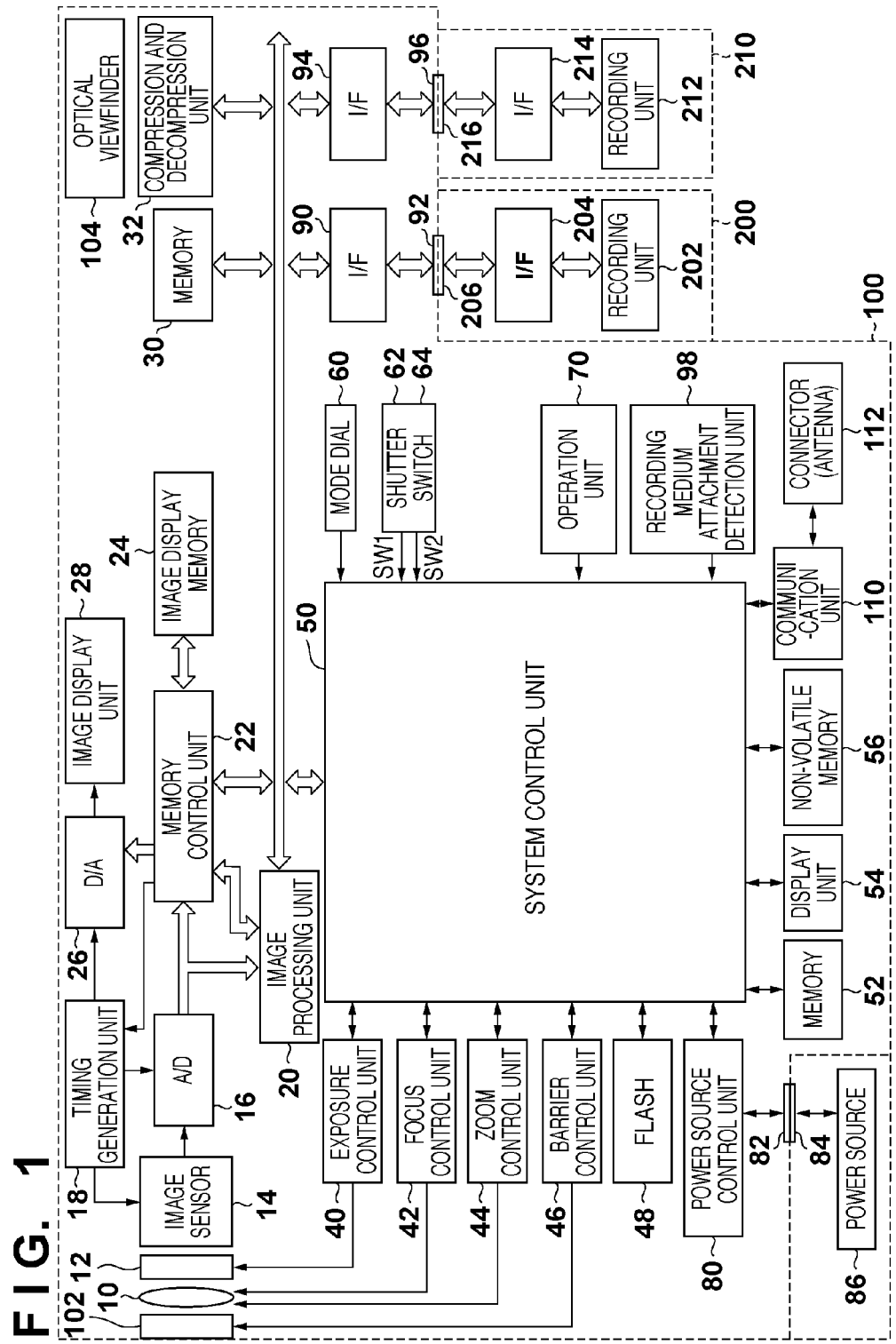
FIG. 1 is a block diagram illustrating an example of a functional configuration of a digital still camera that serves as an example of an image processing apparatus according to an embodiment of the present invention.

FIG. 1 is a block diagram illustrating a configuration example of a digital still camera (DSC) 100 that serves as an example of an image-capturing apparatus of the present invention.

A lens 10 includes a focusing lens and constitutes an imaging optical system capable of auto-focus detection. Also, reference numeral 12 indicates a shutter having an aperture function, reference numeral 14 indicates an image sensor that converts optical images to electrical signals such as a CCD, a CMOS sensor, and the like. Reference numeral 16 indicates an A/D converter that converts analog signals output from the image sensor 14 into digital signals.

A timing generation unit 18 supplies clock signals and control signals to the image sensor 14, the A/D converter 16 and a D/A converter 26, and is controlled by a memory control unit 22 and a system control unit 50.

An image processing unit 20 performs predetermined pixel interpolation processing and color conversion processing on data received from the A/D converter 16 and data from the memory control unit 22.

Also, predetermined operation processing is performed in the image processing unit 20 using the data of captured images. Then, based on the obtained operation results, the system control unit 50 controls an exposure control unit 40 and a focus control unit 42, thereby realizing autofocusing (AF), automatic exposure (AE), and flash light pre-emission (EF) functions of the through-the-lens (TTL) system.

Furthermore, in the image processing unit 20, predetermined operation processing is performed using data of captured images, and automatic white balance (AWB) processing of the TTL system is also performed based on the obtained operation results.

The memory control unit 22 controls the A/D converter 16, the timing generation unit 18, an image processing unit 20, an image display memory 24, the D/A converter 26, a memory 30 and a compression and decompression unit 32.

Data output from the A/D converter 16 is written in the image display memory 24 or the memory 30 via the image processing unit 20 and the memory control unit 22, or via the memory control unit 22.

Image data for display written in the image display memory 24 is displayed by an image display unit 28 such as an LCD or an organic EL display via the D/A converter 26. It is possible to realize an electronic finder function by sequentially displaying data of captured images with the image display unit 28.

Also, the display by the image display unit 28 can be turned on and off according to instructions given by the system control unit 50. When the display is turned off, the power consumption of the DSC 100 can be greatly reduced.

The memory 30 is a storage device for storing still images and moving images that have been captured, and has a storage capacity sufficient for storing a predetermined number of still images, or moving images for a predetermined amount of time. Therefore, also in the case of continuous shooting and panorama shooting in which a plurality of still images are captured continuously, a large amount of image data can be written into the memory 30 at high speed.

In addition, the memory 30 can be also used as a working region of the system control unit 50.

The compression and decompression unit 32 reads images stored in the memory 30, performs known data compression processing and data decompression processing using the adaptive discrete cosine transform (ADCT), the wavelet transform or the like, and writes the data obtained by the processing to the memory 30.

The exposure control unit 40 controls the shutter 12, which has an aperture function, and also realizes a function of adjusting a flash light through cooperation with a flash 48.

The focus control unit 42 controls focusing of the lens 10, and a zooming control unit 44 controls zooming of the lens 10. A barrier control unit 46 controls operations of a lens barrier 102 for protecting the lens 10.

The flash 48 functions as an auxiliary light source at the time of image-capturing, and also has a light adjusting function. The flash 48 also has a function of projecting AF auxiliary light.

The exposure control unit 40 and the focus control unit 42 are controlled using the TTL system, and the system control unit 50 controls the exposure control unit 40 and the focus control unit 42 based on operation results that are obtained by the image processing unit 20 performing operation on captured image data.

The system control unit 50 is, for example, a CPU, and performs overall control of the DSC 100 by executing programs stored in a memory 52. The memory 52 stores constants, variables, programs and the like for the operation of the system control unit 50.

A display unit 54 is configured by a combination of output apparatuses, such as an LCD, an LED, a speaker and the like, and outputs operation states, messages and the like using characters, images, sounds and the like, upon execution of a program with the system control unit 50. One or a plurality of display units 54 are disposed in positions near an operation unit 70 of the DSC 100 where the display unit 54 can be easily viewed. In addition, some of the display units 54 are provided inside an optical viewfinder 104.

For example, the display unit 54 performs displays listed below: single shooting/continuous shooting display, self-timer display, compression rate display, display of the number of recoding pixels, display of the number of recording pixels, display of the number of recorded shots, display of the number of remaining shots, shutter speed display, aperture value display, exposure correction display, flash display, red eye reduction display, macro-shooting display, buzzer setting display, display of remaining clock battery, display of remaining battery, error display, display of information by plural-digit numbers, display of attachment/detachment state of recording media 200 and 210, display of operation of the communication I/F, date and time display, display indicating the connection state with an external computer, focus display, display indicating completion of preparation for image-capturing, handshake warning display, flash charge display, display of writing operation in a recording medium. Some of these are displayed in the optical viewfinder 104.

Of the displays performed by the display unit 54, those described below are displayed with LEDs or the like: focus display, display indicating completion of preparation for image-capturing, handshake warning display, flash charge display, flash charge completion display, display of writing operation in a recording medium, display notifying macro photography setting, secondary battery charge state display, and the like.

Of the displays performed by the display unit 54, a self-timer display, for example, is performed using a lamp or the like such as a self-timer notifying lamp. The self-timer notifying lamp may be also used as the AF auxiliary light.

A non-volatile memory 56 is a memory from which data can be erased or in which data can be recorded electrically, and for example, an EEPROM may be used.

A mode dial 60, shutter switches 62 and 64 and the operation unit 70 each constitute a user interface for inputting various types of operation instructions to the system control unit 50. The user interface is configured by one of a button, a switch, a dial, a touch panel, pointing through detection of the line of sight, a voice-recognition device and the like, or any combination thereof.

Here, these user interfaces will be described specifically.

The mode dial 60 is a switch for switching and setting various function modes, for example, turning off, an automatic image capturing mode, a programmed image capturing mode, a panorama shooting mode, a reproduction mode, a multiple screen reproduction and erasure mode, and a PC connection mode.

The first shutter switch SW1 62 reaches the ON state in the middle of the operation of a shutter button (not shown) provided in the DSC 100 (when the shutter button is pressed halfway). Upon the first shutter switch SW1 62 reaching the ON state, start of operations such as autofocusing (AF) processing, automatic exposure (AE) processing, automatic white balance (AWB) processing, and flash light pre-emission (EF) processing is instructed.

The second shutter switch SW2 64 reaches the ON state upon completion of the operation of the unshown shutter button (when the shutter button is fully pressed). Upon the second shutter switch SW2 64 reaching the ON state, start of the following processing is instructed: exposure processing in which a signal read from the image sensor 14 is written as image data in the memory 30 via the A/D converter 16 and the memory control unit 22, development processing using operations performed in the image processing unit 20 and the memory control unit 22, and recording processing in which image data is read out from the memory 30, compressed by the compression and decompression unit 32, and written in the recording medium 200 or 210.

The operation unit 70 is configured by various types of buttons, a touch panel and the like. For example, the operation unit 70 is configured by a menu button, a set button, a macro button, a button for moving to a new page in multi-screen reproduction, a button for switching single shooting/continuous shooting/self-timer, a button for moving to different menu (plus (+) button), a button for moving to different menu (minus (−) button), a button for moving to different reproduced image (plus (+) button), a button for moving to different reproduced image (minus (−) button), a capturing quality selection button, an exposure correction button, a date/time setting button, a compression mode switch, and the like.

The compression mode switch is for selecting a compression rate for the JPEG (Joint Photographic Expert Group) compression, or a RAW mode in which signals from an image sensor are digitalized as they are and recorded in a recording medium.

In the present embodiment, the JPEG compression mode includes, for example, a normal mode and a fine mode. A user of the DSC 100 can perform image capturing by selecting the normal mode when he or she puts priority on the data size of the captured image, and selecting the fine mode when he or she puts priority on the image quality of the captured image.

In the JPEG compression mode, the compression and decompression unit 32 reads out image data written in the memory 30, compresses the image data at a set compression rate, and thereafter, records the image data in the recording medium 200, for example.

In the RAW mode, image data is read out from each line according to the array of pixels of the color filter of the image sensor 14 without change, and image data written in the memory 30 is read out via the A/D converter 16 and the memory control unit 22, and recorded in the recording medium 200.

A power source control unit 80 is configured by a battery detection circuit, a DC-DC converter, a switch circuit for switching the block to which current is applied. The power source control unit 80 detects whether or not a battery is attached, the type of battery, and the remaining level of battery, controls the DC-DC converter based on the results of the detections and instructions given by the system control unit 50, and thereby applies a necessary voltage to each unit, including recording media, for a necessary period of time.

A power source 86 is formed by a primary battery such as an alkaline battery or a lithium battery, a secondary battery such as an NiCd battery, an NiMH battery or a Li battery, or an AC adapter, and is attached to the DSC 100 by connectors 82 and 84.

The recording media 200 and 210 such as a memory card or a hard disk respectively include recording units 202 and 212 each configured by a semiconductor memory, a magnetic disk or the like, and interfaces 204 and 214 and connectors 206 and 216 with the DSC 100. The recording media 200 and 210 are attached to the DSC 100 via the connectors 206 and 216 on the media side and connectors 92 and 96 on the DSC 100 side, respectively. Interfaces 90 and 94 are respectively connected to the connectors 92 and 96. Attachment of the recording media 200 and 210 to the DSC 100 is detected by a recording medium attachment detection unit 98.

Note that in the present embodiment, the DSC 100 has been described as having two systems of the interface and the connector for attaching a recording medium. However, the number of each of the interface and the connector for attaching a recording medium may be any number including one. Also, each system of the interface and the connector may conform to a different standard.

Interfaces and connectors that conform to any of various standards may be used.

Furthermore, when the interfaces 90 and 94 and the connectors 92 and 96 that conform to any of various standards are used, it is possible by connecting various communication cards to exchange image data and management information thereof with other computers or peripheral equipment such as a printer.

The lens barrier 102 prevents an imaging unit from being smeared or damaged by covering the imaging unit that includes the lens 10 of the DSC 100.

The optical viewfinder 104 is, for example, a TTL finder, and images a light flux that has passed through the lens 10, using a prism, a mirror and the like. Using the optical viewfinder 104, it is possible to perform imaging without using the electronic finder function realized by the image display unit 28. Also, as described above, within the optical viewfinder 104, some of the functions provided by the display unit 54, that is, for example, display of information such as the focus display, handshake warning display, flash charge display, shutter speed display, aperture value display, and exposure correction display are performed.

A communication unit 110 performs various types of communication processing such as that based on RS232C, USB, IEEE 1394, P1284, SCSI, modem, LAN and wireless communication.

A connector (in the case of wireless communication, antenna) 112 connects the DSC 100 to other devices via the communication unit 110.

Figure 2:
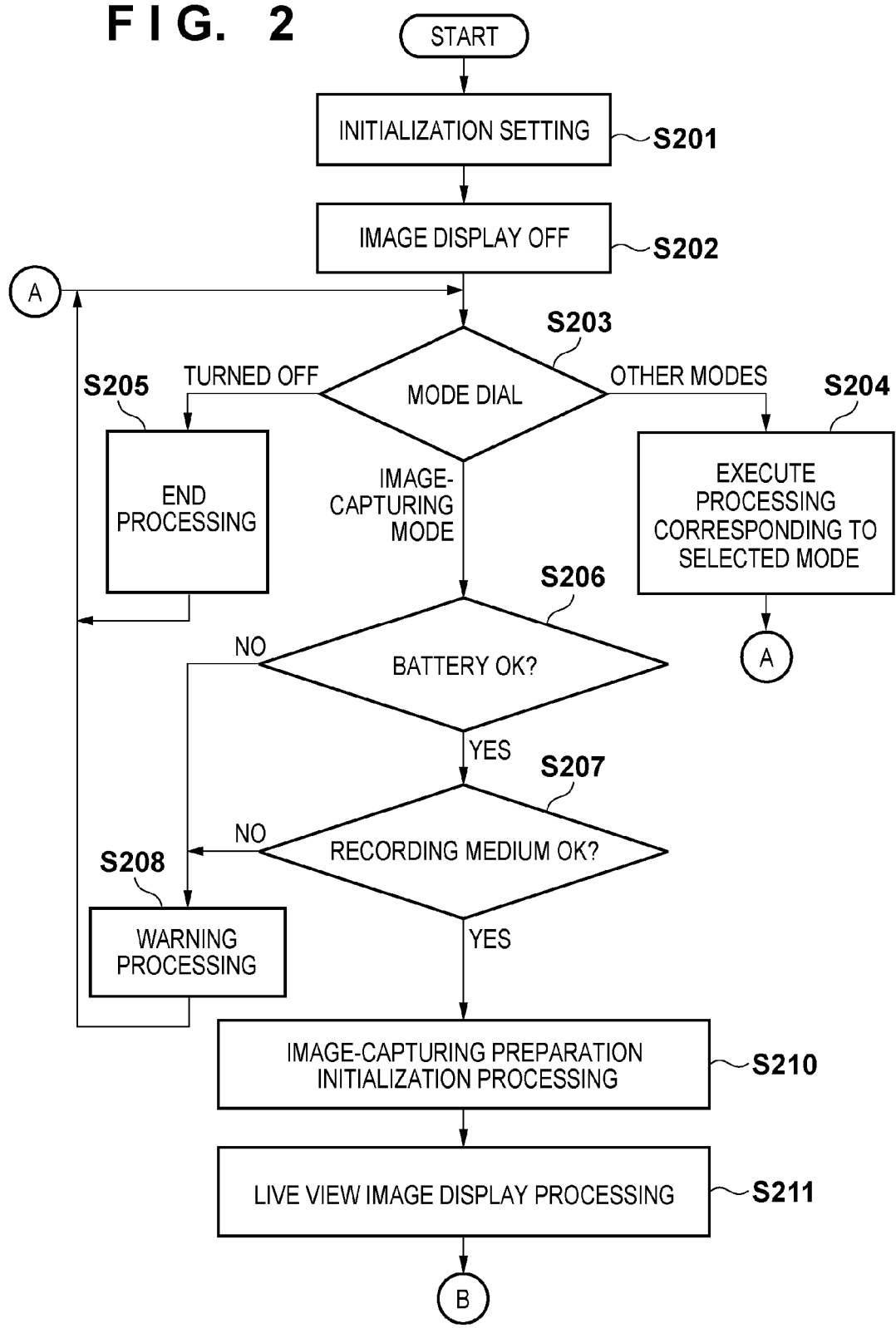
FIG. 2 is a flowchart illustrating an overall operation of the digital still camera according to an embodiment of the present invention.
Figure 3:
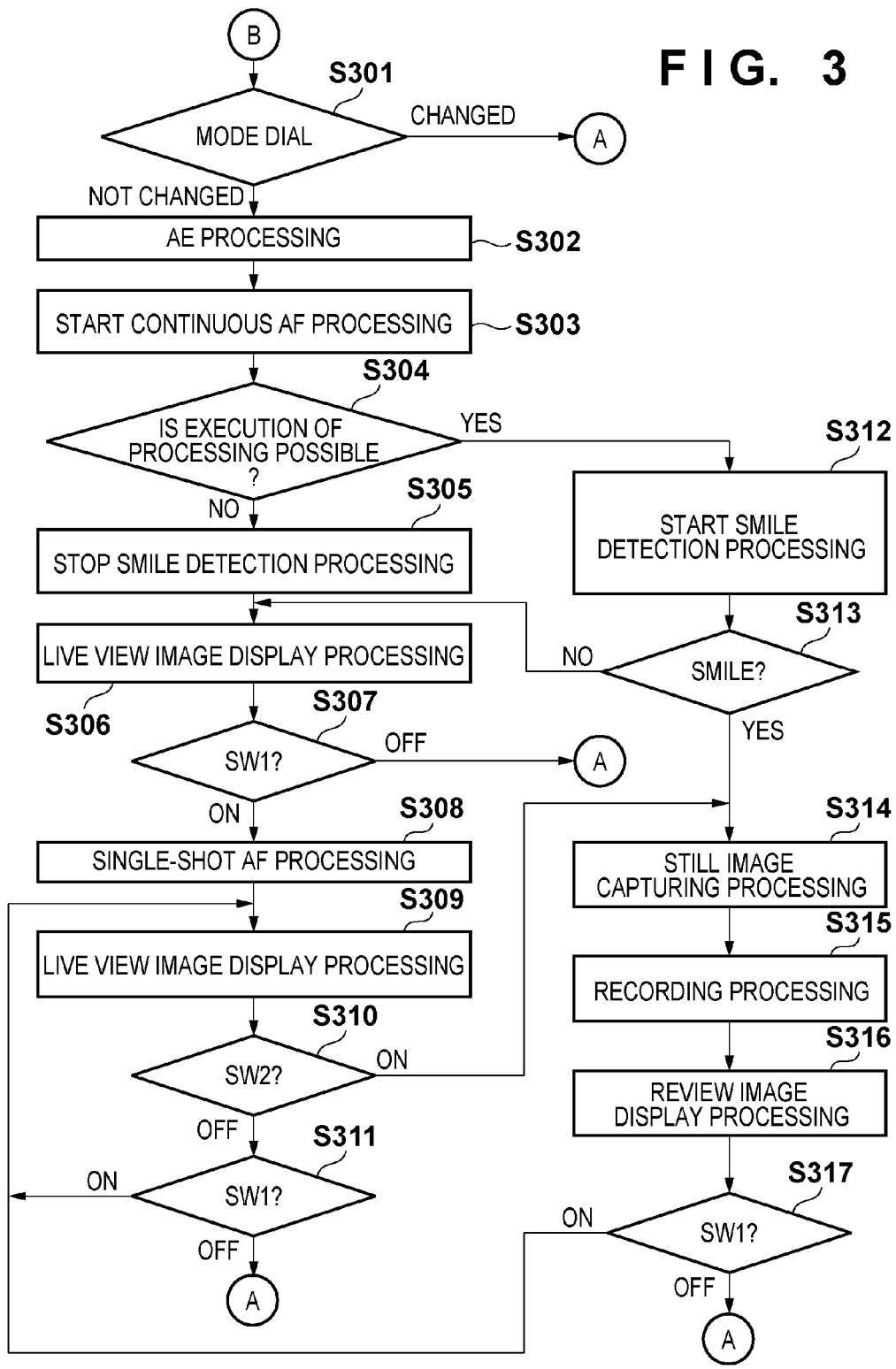
FIG. 3 is a flowchart illustrating the overall operation of the digital still camera according to an embodiment of the present invention.

FIGS. 2 and 3 each show a flowchart illustrating an overall operation of the DSC 100.

When the DSC 100 is turned on after replacement of a battery or the like, the system control unit 50 initializes flags, control variables, and the like (step S201), and sets the image display by the image display unit 28 to the OFF state by default (step S202).

The system control unit 50 determines the setting position of the mode dial 60. If the mode dial 60 is set to the off state (step S203), the system control unit 50 returns processing to step S203 after predetermined end processing is performed (S205). Here, the end processing includes processing described below: processing for setting the display in each display unit to the end state, processing for closing the lens barrier 102, processing for recording parameters, setting values and setting modes that include flags, control variables, and the like in the non-volatile memory 56, and processing for cutting, with the power source control unit 80, unnecessary supply of power to the units in the DSC 100 including the image display unit 28.

Conversely, if the mode dial 60 is set to another mode in step S203, the system control unit 50 executes processing corresponding to the selected mode (step S204), and returns processing to step S203.

If the mode dial 60 is set to the image-capturing mode in step S203, the system control unit 50 checks, with power source control unit 80, the remaining capacity and the operation state of the power source 86 configured by a battery and the like (step S206). Then, the system control unit 50 determines whether there is any problem in the power source 86 for the operation of the DSC 100. If there is a problem, the system control unit 50 presents, with the display unit 54, a predetermined warning display using an image or a sound (step S208), and returns processing to step S203.

If there is no problem in the power source 86 (step S206), the system control unit 50 determines whether there is any problem in the recording medium 200 or 210 for the operation of the DSC 100, especially, for the recording and reproducing operation (step S207). If there is a problem, the system control unit 50 presents, with the display unit 54, a predetermined warning display using an image or a sound (step S208), and returns processing to step S203.

If there is no problem in the recording medium 200 or 210, initialization processing for causing the image display unit 28 to function as a finder is performed in step S210. Specifically, the system control unit 50 sets elements necessary for generating captured images for live view display (live view images), such as the image sensor 14, the image processing unit 20, the memory control unit 22 and the like, to a live view image display state in which captured video signals are sequentially displayed. That is, the live view image display state corresponds to capturing of moving images for display.

When preparation for image capturing has been completed, the system control unit 50 starts capturing moving images, and displaying live view images in the image display unit 28 (step S211).

In the live view image display state, video signals that are sequentially written in the image display memory 24 via the image sensor 14, the A/D converter 16, the image processing unit 20 and the memory control unit 22 are sequentially displayed by the image display unit 28 via the memory control unit 22 and the D/A converter 26. In this manner, the image display unit 28 can function as an electronic view finder (EVF). Also, the system control unit 50 starts face detection processing using the image processing unit 20. Any known method may be used for this face detection in the input image. For example, Japanese Patent Laid-Open No. 4-346333 discloses a method in which a face is determined by converting photometric data to hue and saturation, preparing a two-dimensional histogram of the converted hue and saturation, and analyzing the histogram. Furthermore, Japanese Patent Laid-Open No. 8-063597 discloses a technique in which face candidates that correspond to the shape of human face are extracted, and the region where a face is actually present is narrowed down from among the regions of the face candidates based on the feature amounts obtained from the regions. The image processing unit 20 of the present embodiment detects a face of a person by extracting luminance information from an image, and then extracting portions corresponding to shapes that indicate face component elements based on the luminance information.

Next, the operation of the DSC 100 for capturing still images in the live view image display state will be described with reference to the flowcharts in FIGS. 3 and 4.

In step S301, the system control unit 50 checks whether the setting of the mode dial 60 has been changed. If it is detected that the setting has been changed, the system control unit 50 returns processing to step S203, and performs processing that corresponds to the state of the mode dial 60. If the setting has not been changed, the system control unit 50 performs in step S302 AE processing in which exposure conditions used for capturing live view images are automatically set. Specifically, the image processing unit 20 performs a predetermined photometric operation on a signal obtained from the image sensor 14, and stores the operation results in the memory 30. Then, the system control unit 50 performs automatic exposure control processing in capturing live view images by using the exposure control unit 40, based on the operation results stored in the memory 30. If a face has been detected by the image processing unit 20, the exposure control unit 40 performs exposure control such that the luminance of that face has an appropriate value.

In step S303, the system control unit 50 starts continuous AF processing. Note that AF in which the focusing operation is performed once is called single AF, and AF in which the focusing operation is continuously performed is called continuous AF. The focusing operation in the continuous AF processing will be described below in detail with reference to FIGS. 5 and 6.

In step S304, the system control unit 50 determines whether execution of smile detection processing is possible according to the operation state of the continuous AF processing in step S303. Determination of whether execution of the smile detection processing is possible will be described below in detail with reference to FIG. 4. If the system control unit 50 has determined in step S304 that execution of the smile detection processing is possible, it advances the procedure to step S312, if it has determined that execution of the smile detection processing is impossible, it advances the procedure to step S305.

In step S312, the system control unit 50 starts the smile detection processing using the image processing unit 20. Specifically, a face on which smile detection is performed is specified from among faces of people detected by the image processing unit 20. Then, the image processing unit 20 performs face-expression estimation processing by computing feature amounts for individual elements (e.g., eyes and mouth) of the face on which smile detection is performed, and thereby calculates the degree of smile of the face (smile degree). The smile degree is expressed by numerical values in the range of −50 to +50, for example.

Note that any known method can be applied to the face-expression estimation based on feature amounts of the face. The image processing unit 20 of the present embodiment detects an expression or motions in the face of a person based on the shapes of and the relative positional relationship between elements such as eyes and mouth that are in a detected region where the face of the person is present. For example, if it has been detected that the tail of the eyes slopes downward and the corner of the mouth is raised in a detected face region, the person having that face is determined to be smiling. The image processing unit 20 calculates the smile degree according to the degree of downward slope of the tail of the eyes and the rising of the corner of the mouth. Since detailed information on the face such as the degree of downward slope of the tail of the eyes and the rising of the corner of the mouth is required in the smile detection, the smile detection requires a higher resolution of input images than the face detection.

Also, there is no limitation on the method for specifying a face on which smile detection is performed from among detected faces, and thus any method may be used for this. For example, the method may be designated by a user, or may be specified based on at least one condition such as the position of the face in the input image (e.g., the face that is the closest to the center), the size of the face (e.g., the face detected as having the largest size), or the reliability of the face detection (e.g., the face having the highest reliability).

The system control unit 50 determines in step S313 whether the smile degree calculated in the smile detection processing in step S312 is larger than or equal to a predetermined threshold. If the smile degree is larger than or equal to the threshold, the system control unit 50 advances the procedure to step S314, namely, still image capturing processing. In this manner, the smile shutter function is realized by which an image is automatically captured upon detection of a smile.

Conversely, if the calculated smile degree is less than the threshold, the system control unit 50 advances the procedure to step S306, and continues the live view image display.

The system control unit 50 stops the smile detection processing in step S305. Specifically, the system control unit 50 stops the smile detection processing when it has been determined that execution of the smile detection processing is impossible after the smile detection processing has been started in step S312, and advances the procedure to step S306.

In step S306, the system control unit 50 performs processing for continuing the live view image display by the image display unit 28, and advances the procedure to step S307.

In step S307, the system control unit 50 checks the state of the first shutter switch SW1 62, and if it is not in the ON state, the system control unit 50 returns processing to step S203, and if it is in the ON state, the system control unit 50 advances the procedure to step S308.

The system control unit 50 performs single-shot AF processing in step S308. Specifically, the image processing unit 20 performs a predetermined computation of the focus adjustment amount on a signal obtained from the image sensor 14, and stores the computation results in the memory 30. The system control unit 50 performs AF processing with the focus control unit 42 based on the computation results of the focus adjustment amount, and focuses the lens 10 on the subject. If a face has been detected in an input image the system control unit 50 computes a focus adjustment amount for that face, and focuses the lens 10 on the face with the focus control unit 42. Thereafter, the system control unit 50 causes the image display unit 28 to display live view images (step S309), and advances the procedure to step S310.

In steps S310 and S311, the system control unit 50 checks the state of the second shutter switch SW2 64 and the first shutter switch SW1 62. If the second shutter switch SW2 64 is in the OFF state and the first shutter switch SW1 62 is also in the OFF state, the system control unit 50 returns processing to step S203. If the second shutter switch SW2 64 is in the OFF state and the first shutter switch SW1 62 remains in the ON state, the system control unit 50 continues to execute the processing in step S309. If the second shutter switch SW2 64 has reached the ON state, the system control unit 50 advances the procedure to step S314.

Still image capturing processing is executed in steps S314 to S316.

In step S314, the system control unit 50 starts reading out video signals from the image sensor 14 in synchronization with the timing generation unit 18. Video signals sequentially read out from the image sensor 14 are converted to image data by the A/D converter 16, and are sequentially stored in the memory 30. Next, the image processing unit 20 executes development processing on the image data stored in the memory 30. The development processing includes white balance correction processing, color interpolation processing, edge enhancement processing, gamma correction processing and the like. After that, the compression and decompression unit 32 performs coding processing based on the JPEG format or the like so as to generate JPEG image files having a predetermined header, and stores the JPEG image files in the memory 30.

In step S315, the system control unit 50 writes the image files written in the memory 30 in the recording medium 200, for example. In step S316, the system control unit 50 displays the image captured in step S314 as a review image by the image display unit 28, and thereby completes the still image capturing processing.

In step S317, the system control unit 50 checks the state of the first shutter switch SW1 62, and if it is not in the ON state, the system control unit 50 returns processing to step S203. If it is in the ON state, the system control unit 50 returns processing to step S309 where live view images are displayed, returning to a capturing standby state.

Next, the determination as to whether execution of the smile detection processing is possible that is performed in step S304 will be described in detail with reference to the flowchart shown in FIG. 4.

In step S401, the system control unit 50 acquires the operation state of the continuous AF processing started in step S303.

As described below, the continuous AF processing is realized by executing the following three states successively:
  a hill-climbing AF state in which a peak of focus state is searched for while driving the focusing lens,
  a movement-to-target-position state in which the focusing lens is moved to the position of the peak of focus state found by the search, and
  a monitoring state in which the focus state after the focusing lens has reached the position of the peak of focus state is monitored.

In step S402, the system control unit 50 determines whether the continuous AF processing is in the hill-climbing AF state. If the continuous AF processing is in the hill-climbing AF state, the system control unit 50 advances the procedure to step S405, and determines that execution of the smile detection processing is impossible. If the continuous AF processing is not in the hill-climbing AF state, the system control unit 50 advances the procedure to step S404.

In step S404, the system control unit 50 determines whether the continuous AF processing is in the movement-to-target-position state or the monitoring state, and the current focus state is in the vicinity of the peak of focus state. This determination may be performed by using either of the two methods, namely, the determination method described below with reference to FIG. 5 that uses the contrast value and the determination method described below with reference to FIG. 6 that uses the focus depth. If the current focus state is determined to be in the vicinity of the peak of focus state, the system control unit 50 advances the procedure to step S406, and determines that execution of the smile detection processing is possible. If it is determined that the current focus state is not in the vicinity of the peak of focus state, the system control unit 50 advances the procedure to step S405, and determines that execution of the smile detection processing is impossible.

FIG. 5 shows a timing chart illustrating a method for performing determination in step S404 in FIG. 4 using the contrast value.

In FIG. 5, the horizontal axis indicates time and the vertical axis indicates an AF evaluation value. The AF evaluation value is obtained by converting the contrast (luminance difference) of an image into numerical values, the contrast being obtained by applying a bandpass filter or performing integration on a signal contained in a predetermined region of the image. The contrast of the image varies according to the degree of focus, and it is known that the lower the degree of focus, the lower the contrast. In the hill-climbing AF state, the system control unit 50 checks the AF evaluation value while gradually driving the focus lens through the focus control unit 42, and searches for the position of the focus lens where the highest AF evaluation value is obtained. The hill-climbing AF is performed by driving the position of the focus lens in a direction in which the AF evaluation value increases, and the system control unit 50 maintains the hill-climbing AF state until a maximal value of the AF evaluation value is found. The focus state in which a maximal value of the AF evaluation value is obtained is called a peak of focus state, and the system control unit 50 stores the AF evaluation value (if necessary, with the position of the focus lens) in the peak of focus state in the memory 30, for example. However, even when a maximal value of the AF evaluation value is obtained, if the AF evaluation value at that time is less than a threshold set to a value that is large enough for performing the determination of the focus state, the system control unit 50 determines that the search for the peak of focus state has not been finished yet, and maintains the hill-climbing AF state. Also, even if the AF evaluation value is higher than the threshold, if a maximal value of the AF evaluation value has not been obtained, the system control unit 50 determines that the search for the peak of focus state has not been finished yet, and maintains the hill-climbing AF state.

Upon completion of the search for the peak of focus state by the hill-climbing AF processing, the system control unit 50 sets the continuous AF processing to the movement-to-target-position state so as to move the focus lens to the position corresponding to the peak of focus state through the focus control unit 42.

When the focus lens has been moved to the position corresponding to the peak of focus state, the system control unit 50 sets the continuous AF processing to the monitoring state, and starts monitoring the AF evaluation value. If the AF evaluation value at the current focus lens position has become less than or equal to a predetermined value, the system control unit 50 again repeats processing from the hill-climbing AF state.

In the present embodiment, in the determination performed in step S404 in FIG. 4, the current focus state is determined to be in the vicinity of the peak of focus state if a predetermined AF evaluation value (hereinafter referred to as the "smile detection processing control threshold") is exceeded, the predetermined AF evaluation value being set to a value that is a little lower than the AF evaluation value corresponding to the peak of focus state detected in the hill-climbing AF state. That is, in step S404, the system control unit 50 determines that the current focus state is in the vicinity of the peak of focus state if the current AF evaluation value exceeds the smile detection processing control threshold. Conversely, the system control unit 50 determines that the current focus state is not in the vicinity of the peak of focus state if the current AF evaluation value is less than the smile detection processing control threshold. Note that with this method, the smile detection processing control threshold cannot be set until the peak of focus state is found, and thus the system control unit 50 can determine that execution of the smile detection processing is possible only if the peak of focus state is found.

FIG. 6 is a timing chart illustrating a method for performing the determination in step S404 in FIG. 4 using the subject distance.

FIG. 6 also illustrates, as in FIG. 5, how the continuous AF processing transitions from the hill-climbing AF state to the monitoring state through the movement-to-target-position state. The horizontal axis indicates time, and the vertical axis indicates the number of counts of the driving pulse of the focus lens output by the focus control unit 42. Note that the count of the driving pulse is increased when the focus lens is moved from the initial position, and is decreased when the focus lens is moved in a direction returning to the initial position. Accordingly, the number of counts of the driving pulse in FIG. 6 represents a change in the position of the focus lens. FIG. 6 shows that when the focus lens is driven at a constant speed from the initial position, the number of counts of the driving pulse increases at a constant rate until the end of the hill-climbing AF processing, and the focus lens is returned toward the initial position when it is moved to a target position. Also, it should be noted that although a change in the AF evaluation value is indicated by a dashed line in FIG. 6 for reference, the scale of the change in the vertical direction does not correspond to the vertical axis in FIG. 6.

The peak of focus state refers to the point at which the AF evaluation value is the highest in the hill-climbing AF state, and the system control unit 50 stores the number of counts of the driving pulse of the focus lens corresponding to the peak of focus state. Since the driving pulse can be converted to the focal position (subject distance), a predetermined range that includes the subject distance corresponding to the peak of focus state and a region in the vicinity thereof serves as the vicinity of the peak of focus state. If the peak of focus state is detected in the hill-climbing AF state, the system control unit 50 sets two thresholds that define the vicinity of the peak of focus state as first and second smile detection processing control thresholds.

Then, the system control unit 50 determines in step S404 that the current focus state is in the vicinity of the peak of focus state if the number of counts of the current driving pulse obtained from the focus control unit 42 is within the range between the first and the second smile detection processing control thresholds. Specifically, if the relation that the first smile detection processing control threshold≤the number of counts of the current driving pulse≤the second smile detection processing control threshold is satisfied, the system control unit 50 determines that the current focus state is in the vicinity of the peak of focus state. Conversely, if the number of counts of the current driving pulse obtained from the focus control unit 42 is outside the range between the first and the second smile detection processing control thresholds, the system control unit 50 determines that the current focus state is not in the vicinity of the peak of focus state.

Note that control may be performed such that ON and OFF of the smile determination processing are switched while constantly executing the smile detection processing by using live view display images, by allowing the smile determination processing in step S312 and by prohibiting the smile determination processing in step S305 in FIG. 3. That is, control may be performed such that whether or not to allow use of the detection results obtained in the smile detection processing is switched while continuing execution of the smile detection processing.

As described above, according to the present embodiment, in an image-capturing apparatus that is capable of executing expression detection processing on the subject and auto-focus detection processing based on the image contrast in parallel, whether the expression detection processing can be executed on the subject is determined while taking the state of the auto-focus detection processing and the current focus state into account. Specifically, the expression detection processing is not executed if the peak of focus state has not been found in the auto-focus detection processing, or if it is determined that the current focus state is not in the vicinity of the peak of focus state even if the peak of focus state has been found. Therefore, it is possible to reduce the risk that the expression detection processing is performed on an image in a non-focus state, resulting in an erroneous detection. As a result, it is possible to provide, for example, a highly accurate smile shutter function. In addition, since the smile detection processing is not executed in the non-focus state, unnecessary operation processing can be omitted and thus power conservation is also possible.

Note that even if the system control unit 50 has determined to not execute the expression detection processing, or to not allow use of the results of the expression detection processing, the image processing unit 20 executes the face detection processing and uses the results of the face detection processing. This is because the resolution required for the input image is low in the face detection processing compared with the smile detection processing, and there is little possibility of erroneous detection even with respect to images in the non-focus state. Another reason is that it is necessary to detect a face in an input image in which the face is not in the focus state and compute the focus adjustment amount for the face in order to focus the lens 10 on the face through the AF processing.

Other Embodiments

The present invention has been described with reference to the embodiments described above. It will be apparent that those skilled in the art can modify or substitute the embodiments without departing from the gist of the present invention. For example, in the foregoing embodiments, although the case was described in which the present invention is applied to a digital still camera, the present invention can be applied to apparatuses that include an image-capturing apparatus such as cellular phones, personal digital assistances (PDAs), personal computers, and media players.

Also, in the present invention, although smile detection was described as an example of detecting a specific expression of the subject, another expression may be detected. In addition, although an automatic capturing function was described as a function that is executed upon detection of a specific expression, the present invention can be applied to any operation performed in a state in which the expression detection processing and automatic focus control are executed in parallel. For example, the present invention can be applied to a function of automatically capturing a still image when smile is detected during moving image capturing, or a function of automatically adding a chapter (bookmark) to smile scenes.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-293801 filed on Dec. 28, 2010 and 2011-254459 filed on Nov. 21, 2011, which are hereby incorporated by reference herein their entirety.

What is claimed is:

1. An image-capturing apparatus comprising:
   a capturing unit that captures an image of a subject;
   a focus detection unit that performs auto-focus detection of an imaging optical system based on a contrast of an image captured by the capturing unit;
   an expression detection unit that detects a specific expression of the subject from the image captured by the capturing unit; and
   a control unit,
   wherein:
   the image-capturing apparatus being capable of executing the auto-focus detection performed by the focus detection unit and the expression detection performed by the expression detection unit in parallel; and
   in a case where it is determined in the auto-focus detection performed by the focus detection unit that a peak of focus state has not been found, the control unit does not allow execution of the expression detection performed by the expression detection unit, or does not allow use of a result of the expression detection performed by the expression detection unit.

2. The image-capturing apparatus according to claim 1, wherein, in a case where the peak of focus state has been found and it has been determined that a current focus state is not in a vicinity of the peak of focus state, the control unit does not allow execution of the expression detection performed by the expression detection unit, or does not allow use of the result of the expression detection performed by the expression detection unit.

3. The image-capturing apparatus according to claim 1, wherein the focus detection unit continuously performs the auto-focus detection by sequentially executing:
   a hill-climbing AF state for searching for the peak of focus state while driving a focusing lens in the imaging optical system,
   a movement state in which the focusing lens is moved to a position of the peak of focus state found by the search, and
   a monitoring state in which a focus state after the focusing lens has reached the position of the peak of focus state is monitored, and
   in a case where the auto-focus detection performed by focus detection unit is in the hill-climbing AF state, the control unit does not allow execution of the expression detection performed by the expression detection unit, or does not allow use of the result of the expression detection performed by the expression detection unit.

4. The image-capturing apparatus according to claim 2, wherein:
   the focus detection unit calculates an AF evaluation value that indicates a focus state, the AF evaluation value having a maximal value at the peak of focus state; and
   in a case where a current AF evaluation value is less than a predetermined threshold, the control unit determines that the current focus state is not in the vicinity of the peak of focus state.

5. The image-capturing apparatus according to claim 2, wherein, in a case where the number of count of a driving pulse of a focusing lens in the imaging optical system corresponding to a position of the focusing lens is outside a predetermined range including a value that corresponds to the position of the focusing lens corresponding to the peak of focus state, the control unit determines that the current focus state is not in the vicinity of the peak of focus state.

6. The image-capturing apparatus according to claim 1, wherein the control unit executes predetermined processing as a result of the expression detection unit having detected a specific expression of the subject.

7. The image-capturing apparatus according to claim 1, further comprising a face detection unit that detects a face of the subject from the image captured by the capturing unit, and
   wherein:
   the expression detection unit detects a specific expression from the face detected by the face detection unit; and
   even in a case where execution of the expression detection performed by the expression detection unit is not allowed, or use of the result of the expression detection performed by the expression detection unit is not allowed, the control unit allows execution of the face detection performed by the face detection unit and use of a result of the face detection.

8. A method for controlling an image-capturing apparatus, the image-capturing apparatus comprising:

a capturing unit that captures an image of a subject;

a focus detection unit that performs auto-focus detection of an imaging optical system based on a contrast of an image captured by the capturing unit; and an expression detection unit that detects a specific expression of the subject from the image captured by the capturing unit, the image-capturing apparatus being capable of executing the auto-focus detection performed by the focus detection unit and the expression detection performed by the expression detection unit in parallel, and the method comprising a controlling step of, in a case where it is determined in the auto-focus detection performed by the focus detection unit that a peak of focus state has not been found, not allowing execution of the expression detection performed by expression detection unit, or not allowing use of a result of the expression detection performed by the expression detection unit.

9. A non-transitory computer-readable recording medium storing a program for causing a computer of an image-capturing apparatus to function as each unit of claim 1.

* * * * *